June 23, 1959     A. HOFFMAN, JR., ET AL     2,891,781
REACTION CHAMBER FOR PREPARATION OF HIGH
MELTING REACTIVE METALS
Filed May 6, 1955
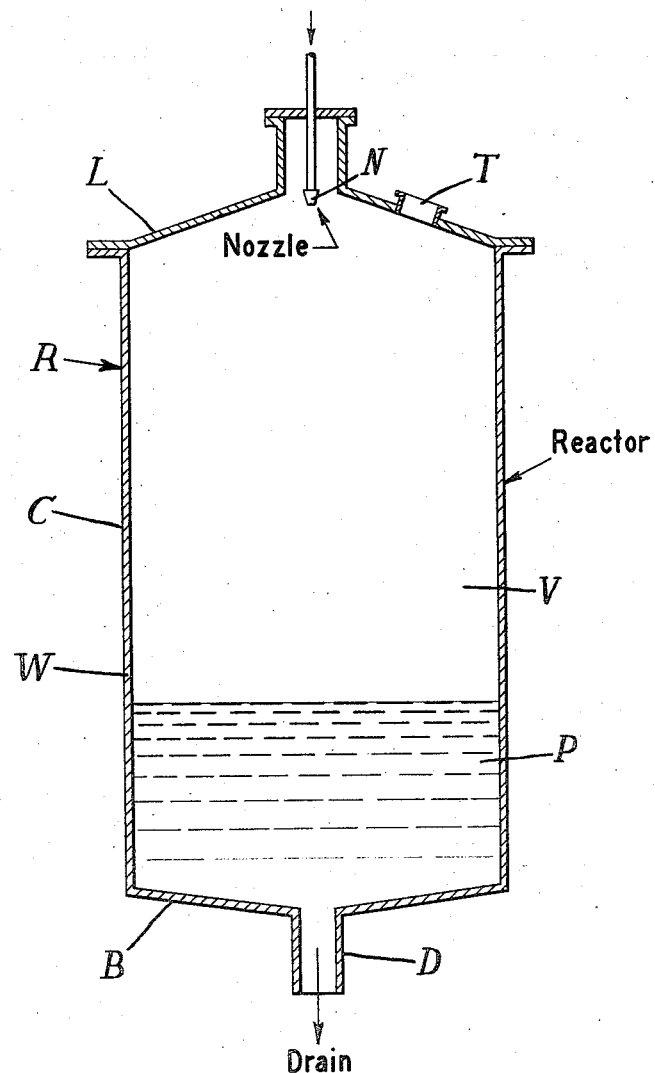
INVENTORS
ALBERT HOFFMAN, JR.
GLEN D. BAGLEY
BY Richard S. Shreve, Jr.
ATTORNEY

United States Patent Office 2,891,781
Patented June 23, 1959

2,891,781

REACTION CHAMBER FOR PREPARATION OF HIGH MELTING REACTIVE METALS

Albert Hoffman, Jr., Niagara Falls, and Glen D. Bagley, Lewiston, N.Y., assignors to Union Carbide Corporation, a corporation of New York Application May 6, 1955, Serial No. 506,541

4 Claims. (Cl. 266—33)

In the preparation of the high melting point reactive metals of groups IV, V, and VI, many problems arise which are difficult to solve. Ordinary metallurgical procedures are not applicable to most of these metals, and special techniques have been evolved for procuring the elements in metallic form. For instance, tantalum, titanium, hafnium, zirconium, vanadium and the like may be produced by reducing halides of these metals by one of the alkali or alkaline earth metals since the latter usually possesses a greater affinity for the halide than is true of the aforementioned metals. Such reduction processes, however, are very difficult to control because, in general, the reactions are highly exothermic and unless the evolution of heat is carefully regulated, processing equipment may be damaged by overheating or by the development of excessive internal pressures which may rupture the equipment.

Many methods have been proposed for producing the high melting point reactive metals in metallic form. One of these is to reduce the oxides by an alkali, or preferably an alkaline earth metal within a bomb-type container of sufficient weight to withstand any internal pressure which may be developed and which may be internally insulated from the heat. Such a system has been employed, for instance, for the reduction of vanadium compounds by calcium metal and is illustrated by U. S. Patents 1,704,257, 1,728,941 and 1,738,669. The procedure is not applicable, however, to some of the halide compounds of the reactive metals since the procedure is useful only when both reactants are solids at room temperature.

Another procedure that has been proposed requires that the reactants be brought together in liquid or vapor form in a liquid bath, one or the other being added rather slowly to the reaction mass in order to regulate the evolution of heat. For instance, Winter, U. S. Patents 2,607,674 and 2,672,121, proposes to introduce a molten reducing metal into a reactor chamber at a relatively slow rate, which chamber contains the refractory metal halide alone or mixed with the by-products of the reaction. The chamber may or may not be fitted with appropriate means for introducing periodically additional quantities of the halide and of withdrawing by-products of the reaction. Jordan, U. S. Patent 2,647,826, proposes to introduce the reactive metal halide and the reducing metal as a vapor into a bath of reducing metal halide. In the former case, if the temperature of the mass exceeds the boiling point of the reactive metal halide, reactions will occur in the vapor above the reacting bath and reaction products will deposit on the upper walls of the chamber and on the inlets for the reactants. Under such circumstances, these inlets will rapidly become plugged and it will, therefore, be impossible to introduce additional reacting materials. In some cases, as for instance when producing titanium metal, the maximum temperature that is permitted is quite low (titanium tetrachloride has a boiling point of 136° C.). The method utilizing introduction of the reactants in the vapor phase requires equipment that is difficult to maintain and is subject to the same tendency for the inlet ports to become plugged.

A more satisfactory procedure that has recently been developed requires the injection of liquid refractory metal halide into a pool of reducing metal. The halide is injected in a small, compact, high-velocity stream which traverses the open or "free board" space above the mass of reducing metal at such speed as to reduce vaporization thereof to a negligible amount. The reducing reaction, therefore, takes place almost entirely in the liquid phase, and product-recovery is materially improved.

It is an object of the present invention to provide a reaction chamber, the dimensions of which are so proportioned as to particularly simplify control of the last-mentioned procedure.

It is another object of the invention to provide a reaction chamber which provides more effective control of the temperature within the reactor and the reaction mass.

It is still another object of the invention to provide a reaction chamber, the design of which permits suppression of undesired vapor phase reactions.

Other objects of the invention will be apparent from the description of the invention.

In the drawing:

The single figure is a vertical section through a reactor according to the preferred embodiment of the present invention.

The reactor R shown in the drawing comprises a chamber C having a bottom B and side walls W, a removable lid L and a nozzle N for injecting a stream of reactant into the chamber, all constructed of heat and pressure resistant materials. The reactor R contains materials partly in the liquid phase in a reactant pool P, and partly in the vapor phase in the space V above the pool P. The removable lid L is provided with a vent T for vapors and the bottom B is provided with a drain D for liquid.

It has been discovered that the proportions of the reaction chamber, in which high melting point reactive metal halides are reduced by an alkali or alkaline earth metal, exert considerable influence on a number of factors directly affecting the commercial practicability of the reducing method. The relationship between the transverse or diammetric dimension and the height of the reactor is the important criterion. This relationship of horizontal, hereinafter identified by the letter D, to the vertical, hereinafter identified by the letter H, dimensions, has been found to materially affect: temperature distribution within the reactor, the extent of vapor phase reactions, pressure variations, the degree of spattering of the reactants onto the upper walls and lid of the reactor, and to be related to the limits within which the rate of injection of the halide may be varied.

In considering reactor proportions, it might be assumed that the ratio of diameter to height for a given volume could be widely varied. However, suppose that the reaction chamber has a very large diameter and a very short height. In this case, a wide, shallow bath of reducing metal would exist, and since the lid of the chamber would be very close to this bath, the temperature of the latter would be substantially the same as that of the main body of the reactor. In contrast to this, the reactor might have a very small diameter but a very great height, in which case the lid might remain very cool in comparison to the reaction zone. In the former case, a high degree of vapor phase reactions would occur, and in the latter there might be little or none. In both cases, considerable difficulty might be anticipated in obtaining continuous and uniform intermixing of the two reactants. It would be expected that the portion of the reducing metal directly under the nozzle, in the case of the large-diameter reactor, would be rapidly consumed and that the products of the reaction might serve to keep separate the remaining injected halide and the unused reducing metal. Similarly, in the case of the tall, small-diameter reactor, the upper portion of the reducing metal would be rapidly reacted and the material below this might not be reached except with great difficulty, by the additionally injected halide. Obviously, neither reactor ratio would be satisfactory. It might still be assumed that the reactor dimensions might be varied within fairly wide limits without reaching the extreme as mentioned above, but such is not the case.

The ratio of diameter to height found satisfactory lies within the following limits: the $D/H$ ratio of the empty reactor should be between 0.2 and 0.6; at the end of the run, the ratio of the free board volume should be within a range of 0.4 to 0.9. Preferred $D/H$ ratios are within the range of 0.30 to 0.5 and 0.6 to 0.8.

Distribution of temperature throughout the reactor is of material importance since it has considerable influence on the conduct of the reaction. Also, the cooler the lid can be maintained throughout the running period, the less difficulty is encountered in maintaining a tight seal between the lid and the reaction body, and general maintenance of the various parts and attachments in the upper portion of the reactor is reduced. Such results are favored by a reactor having a low $D/H$ ratio.

In the injection method of producing high melting point reactive metals, vapor-phase reactions are particularly undesirable for several reasons. Such reactions are particularly accelerated at surfaces where the temperature is relatively high and in areas where the vapors of the reactants initially come in contact with each other. Solid products deposited from such vapor-phase reactions generally occur around vent ports and the injection nozzle, and tend to plug such openings. Such reactions are undesirable since reaction products deposited on the upper surfaces of the reactor are difficult to recover and may contain unreacted materials, all of which contribute to lower metal recovery and efficiency. It has been found that vapor phase reactions may be materially reduced by reactors with a low $D/H$ ratio.

It has also been found that the $D/H$ ratio is related to control of pressure within the reactor. Although pressure control might be considered to be primarily a function of free board volume, and this is indeed correct, it is also influenced by the configuration of the reactor, and it has been found that pressure variations, particularly pressure build-ups, are materially reduced in reactors with a low $D/H$ ratio. It is believed that this is due to the lower temperature maintained in the upper part of the reactor and the reduction of vapor phase reactions.

Although the halide stream is injected at high velocity in the form of a compact, thin body of liquid which penetrates the molten mass in the bottom of the reactor, a certain amount of splashing apparently occurs when solid products of the reaction interfere with the penetration of the liquid stream. Evolution of vapors from the reacting bath may also result in a certain amount of splattering. It has been found that a low thermal gradient permits such splattered materials to drain back into the reactant pool rather than accumulate on the reactor walls, and such a gradient is found in a reactor with a low $D/H$ ratio.

The relationship between $D/H$ and the permissible limits of injection rates of a liquid halide is rather complex and is influenced, to a large extent, by viscosity, density, and particularly the surface tension of the liquid halide. The length of the injection stream must not exceed that within which it maintains a tight, compact body. If the length of a stream is such that it begins to break up into discrete droplets, much of the advantage of the injection method is lost. There is, therefore, a practical limit of height, depending upon the halide being injected. Although a large value of H is desirable in order to maintain a relatively low $D/H$ ratio, the tendency of the injected stream of halide to break up into discrete droplets imposes a limit and therefore defines the minimum ratio which may be used.

Another factor that makes it desirable to keep the $D/H$ ratio relatively high is the problem of removing solid products of reaction from the reaction chamber. While some of these products may be removed from the reactor in liquid form at the conclusion of the reaction period, a large percentage of the total product is necessarily retained in the reactor because it occurs in the form of a large, spongy mass which is not readily conducted through small-diameter exhaust ports. After cooling, this remaining mass must be removed from the reactor by mechanical means and such removal may be more readily accomplished when the reactor diameter is relatively large and thus the $D/H$ ratio is large. This imposes a second limit on the minimum $D/H$ ratio.

Listed in the attached table are dimensions and $D/H$ ratios of both the empty reactor and the free board space at the conclusion of the operation for a series of six sizes of reaction chambers within the scope of the invention. The table also includes data illustrating the actual use of such reactors, supporting the range of $D/H$ ratios given above.

(Part I)

| Unit | D, In. | H, In. | D/H Empty | D/H After Run | Free Board After Run, In. | Vol. Empty Ft.$^3$ |
|---|---|---|---|---|---|---|
| A | 18½ | 72 | 0.26 | 0.53 | 36 | 10.2 |
| B | 42 | 100 | 0.42 | 0.67 | 63 | 82 |
| C | 60 | 156 | 0.38 | 0.72 | 84 | 255 |
| D | 72 | 156 | 0.46 | 0.68 | 106 | 368 |
| E | 84 | 156 | 0.54 | 0.72 | 116 | 500 |
| F | 60 | 192 | 0.31 | 0.50 | 120 | 314 |

(Part II)

| Unit | Halide Feeding Rate, Lb./Min. | | Halide Feeding Velocities, Ft./Sec. | |
|---|---|---|---|---|
| | Min. | Max. | Min. | Max. |
| A | 2 | 5 | 27 | 54 |
| B | 4 | 20 | 19 | 95 |
| C | 19 | 56 | 44 | 102 |
| D | | | | |
| E | | | | |
| F | | | | |

We claim:
1. A reactor for preparation of high melting reactive metals of groups IV, V and VI of the Periodic Table by the high-velocity injection of a liquid stream of a halide of said high melting reactive metal into a pool of a molten reducing metal selected from the group consisting of alkali metals and alkaline earth metals comprising a chamber having a body with bottom and side walls, a removable lid and a nozzle for injecting a stream of reactant into the chamber all constructed of heat and pressure resistant material, and adapted to contain materials partly in the liquid phase in a reactant pool and partly in the vapor phase above said reactant pool, the ratio of the horizontal dimension of said chamber to its vertical dimension being between 0.2 and 0.6 to facilitate the distribution of temperature throughout the reactor, to avoid overheating the removable lid and thereby maintain a tight seal between the lid and the reactor body, to reduce vapor phase reactions and thereby reduce solid deposits around the injection nozzle, vent ports and upper surfaces of the reactor, to reduce pressure variations and facilitate pressure control, to provide a low thermal gradient to permit splattered material to drain back into the reactant pool, to maintain the injection stream as a tight compact body without breaking up into discrete droplets, and to facilitate removal of the large spongy mass of the product of the reaction.

2. A reactor for preparation of high melting reactive metals of groups IV, V and VI of the Periodic Table by the high-velocity injection of a liquid stream of a halide of said high melting reactive metal into a pool of a molten reducing metal selected from the group consisting of alkali metals and alkaline earth metals comprising a chamber having a body with bottom and side walls, a removable lid and a nozzle for injecting a stream of reactant into the chamber all constructed of heat and pressure resistant material, and adapted to contain materials partly in the liquid phase in a reactant pool and partly in the vapor phase above said reactant pool, the ratio of the horizontal dimension of said chamber to its vertical dimension being between 0.3 and 0.5 to facilitate the distribution of temperature throughout the reactor, to avoid overheating the removable lid and thereby maintain a tight seal between the lid and the reactor body, to reduce vapor phase reactions and thereby reduce solid deposits around the injection nozzle, vent ports and upper surfaces of the reactor, to reduce pressure variations and facilitate pressure control, to provide a low thermal gradient to permit splattered material to drain back into the reactant pool, to maintain the injection stream as a tight compact body without breaking up into discrete droplets, and to facilitate removal of the large spongy mass of the product of the reaction.

3. A reactor for preparation of high melting reactive metals of groups IV, V and VI of the Periodic Table by the high-velocity injection of a liquid stream of a halide of said high melting reactive metal into a pool of a molten reducing metal selected from the group consisting of alkali metals and alkaline earth metals comprising a chamber having a body with bottom and side walls, a removable lid and a nozzle for injecting a stream of reactant into the chamber all constructed of heat and pressure resistant material, and adapted to contain materials partly in the liquid phase in a reactant pool and partly in the vapor phase above said reactant pool, the ratio of the horizontal dimension of said chamber to its vertical dimension being between 0.2 and 0.6 to facilitate the distribution of temperature throughout the reactor, to avoid overheating the removable lid and thereby maintain a tight seal between the lid and the reactor body, to reduce vapor phase reactions and thereby reduce solid deposits around the injection nozzle, vent ports and upper surfaces of the reactor, to reduce pressure variations and facilitate pressure control, to provide a low thermal gradient to permit splattered material to drain back into the reactant pool, to maintain the injection stream as a tight compact body without breaking up into discrete droplets, and to facilitate removal of the large spongy mass of the product of the reaction, the ratio of the horizontal dimension of the free board volume at the end of a run to its vertical dimension being between 0.4 and 0.9.

4. A reactor for preparation of high melting reactive metals of groups IV, V and VI of the Periodic Table by the high-velocity injection of a liquid stream of a halide of said high melting reactive metal into a pool of a molten reducing metal selected from the group consisting of alkali metals and alkaline earth metals comprising a chamber having a body with bottom and side walls, a removable lid and a nozzle for injecting a stream of reactant into the chamber all constructed of heat and pressure resistant material, and adapted to contain materials partly in the liquid phase in a reactant pool and partly in the vapor phase above said reactant pool, the ratio of the horizontal dimension of said chamber to its vertical dimension being between 0.2 and 0.6 to facilitate the distribution of temperature throughout the reactor, to avoid overheating the removable lid and thereby maintain a tight seal between the lid and the reactor body, to reduce vapor phase reactions and thereby reduce solid deposits around the injection nozzle, vent ports and upper surfaces of the reactor, to reduce pressure variations and facilitates pressure control, to provide a low thermal gradient to permit splattered material to drain back into the reactant pool, to maintain the injection stream as a tight compact body without breaking up into discrete droplets, and to facilitate removal of the large spongy mass of the product of the reaction, the ratio of the horizontal dimension of the free board volume at the end of a run to its vertical dimension being between 0.6 and 0.8.

References Cited in the file of this patent

UNITED STATES PATENTS

| | | |
|---|---|---|
| 2,266,750 | Gilbert | Dec. 23, 1941 |
| 2,556,763 | Maddex | June 12, 1951 |
| 2,564,337 | Maddex | Aug. 14, 1951 |
| 2,663,634 | Stoddard et al. | Dec. 22, 1953 |
| 2,787,539 | Conklin | Apr. 2, 1957 |

FOREIGN PATENTS

Journal of Metals, vol. 188, issue 4, pages 634–640, publication date, April 1950.